(12) United States Patent
Soffer et al.

(10) Patent No.: US 9,160,644 B1
(45) Date of Patent: Oct. 13, 2015

(54) PACKET PROCESSOR BANDWIDTH VERIFICATION METHODS AND SYSTEMS

(71) Applicant: Marvell Israel (M.I.S.L) Ltd., Yokneam (IL)

(72) Inventors: Amos Soffer, Hod Hasharon (IL); Mickey Rachamim, Mazkeret Batya (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 316 days.

(21) Appl. No.: 13/671,063

(22) Filed: Nov. 7, 2012

Related U.S. Application Data

(60) Provisional application No. 61/557,820, filed on Nov. 9, 2011, provisional application No. 61/636,340, filed on Apr. 20, 2012.

(51) Int. Cl.
*H04L 12/26* (2006.01)

(52) U.S. Cl.
CPC ..................................... *H04L 43/50* (2013.01)

(58) Field of Classification Search
None
See application file for complete search history.

(56) References Cited

U.S. PATENT DOCUMENTS

| | | | |
|---|---|---|---|
| 6,272,113 B1* | 8/2001 | McIntyre et al. | 370/248 |
| 6,765,877 B1* | 7/2004 | Foschiano et al. | 370/250 |
| 7,480,251 B2* | 1/2009 | Foschiano et al. | 370/248 |
| 7,933,268 B1* | 4/2011 | Melman et al. | 370/389 |
| 8,619,599 B1* | 12/2013 | Even | 370/249 |
| 8,854,961 B1* | 10/2014 | Cohen | 370/230.1 |
| 2003/0223376 A1* | 12/2003 | Elliott et al. | 370/249 |
| 2004/0015616 A1* | 1/2004 | Chen | 710/1 |
| 2007/0008897 A1* | 1/2007 | Denton et al. | 370/250 |
| 2009/0161669 A1* | 6/2009 | Bragg et al. | 370/389 |
| 2010/0027536 A1* | 2/2010 | Jorgens et al. | 370/389 |
| 2014/0153406 A1* | 6/2014 | Brolin et al. | 370/241.1 |

* cited by examiner

*Primary Examiner* — Timothy J Weidner
*Assistant Examiner* — Jana Blust

(57) ABSTRACT

Methods and systems for implementing self-testing of packet-processing devices are disclosed. For example, a packet-processing device includes a plurality of ports each having a receive media access controller (RX MAC) and a transmit media access controller (TX MAC), and a switching engine that includes a traffic control table coupled to the plurality of ports. The traffic control table is configured to: provide one or more first test packets to a first port, and enable the first port to perform a packet storming operation so as to create a stream of repeated first packets that are transmitted from the first port to one or more selected second ports.

18 Claims, 13 Drawing Sheets

| | PORT 1 | PORT 2 | PORT 3 | PORT 4 |
|---|---|---|---|---|
| VIRTUAL ID | VID_0 | VID_1 | VID_2 | VID_3 |
| LOOPBACK ENABLE | X | X | X | X |
| PACKET DESTINATION ENABLE | MAC_X_0 | MAC_X_0 | MAC_X_0 | MAC_X_0 |
| | MAC_X_1 | MAC_X_1 | MAC_X_1 | MAC_X_1 |
| | MAC_X_2 | MAC_X_2 | MAC_X_2 | MAC_X_2 |
| | MAC_X_3 | MAC_X_3 | MAC_X_3 | MAC_X_3 |

FIG. 3B

PACKET PROCESSOR BANDWIDTH VERIFICATION METHODS AND SYSTEMS

INCORPORATION BY REFERENCE

This application claims the benefit of U.S. Provisional Application No. 61/636,340 entitled "AUTOMATIC TESTING OF FULL BANDWIDTH CAPABILITIES WITHOUT ANY TESTING EQUIPMENT" filed on Apr. 20, 2012. This application also claims the benefit of U.S. Provisional Application No. 61/557,820 entitled "AUTOMATIC TESTING OF FULL BANDWIDTH CAPABILITIES WITHOUT ANY TESTING EQUIPMENT" filed on Nov. 9, 2011. The content of each aforementioned application is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Packet-processing devices, such as Ethernet routers and switches, play an important role in computer networking systems. Generally, every packet-processing device is thoroughly tested before being sold and deployed. The testing of packet-processing devices can involve lengthy testing programs using sometimes elaborate and expensive test equipment, which in turn can add significantly to the final cost of production.

SUMMARY

Various aspects and embodiments of the invention are described in further detail below.

In an embodiment, a packet-processing device includes a plurality of ports each having a receive media access controller (RX MAC) and a transmit media access controller (TX MAC), and a switching engine that includes a traffic control table coupled to the plurality of ports. The traffic control table is configured to: provide one or more first test packets to a first port, and enable the first port to perform a packet storming operation so as to create a stream of repeated first packets that are transmitted from the first port to one or more selected second ports.

In another embodiment, a method for testing a packet-processor that includes a plurality of ports each having a receive media access controller (RX MAC) and a transmit media access controller (TX MAC) is disclosed. The method includes providing one or more first test packets to a first port, enabling the first port to perform a packet storming operation so as to create a stream of repeated first packets, and transmitting the repeated first packets from the first port to one or more selected second ports.

In yet another embodiment, a chipset for implementing a packet-processing apparatus configured to perform self-testing includes one or more integrated circuits that include a packet-processing device includes a plurality of ports each having a receive media access controller (RX MAC) and a transmit media access controller (TX MAC), and a switching engine that includes a traffic control table coupled to the plurality of ports. The traffic control table is configured to: provide one or more first test packets to a first port, and enable the first port to perform a packet storming operation so as to create a stream of repeated first packets that are transmitted from the first port to one or more selected second ports.

BRIEF DESCRIPTION OF THE DRAWINGS

Various embodiments of this disclosure that are proposed as examples will be described in detail with reference to the following figures, wherein like numerals reference like elements, and wherein:

FIG. 3B shows details of a traffic control table of FIG. 2.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

The following disclosure allows for packet-processing devices to perform most of standard functionality testing with only minimal external equipment, such as traffic generators and packet analyzers, as the tested device itself is used to perform those functions. The packet-processing devices (with embedded self-testing) described below may be used to conduct a broad range of different tests, for example, robust suites of tests to individual tests targeted at specific hardware of interest.

For the purpose of this disclosure, the terms "packet-processing device" or "packet-processing apparatus" is to be construed broadly to encompass any device having specialized hardware capable of receiving and transmitting packets. Such devices include, but are not limited to, network switches, network routers and network bridges. While an Ethernet device is used for the purpose of providing an example below, it is noted that the terms "packet-processing device" or "packet-processing apparatus" may encompass any other known or later developed networking technology.

Figure 1:
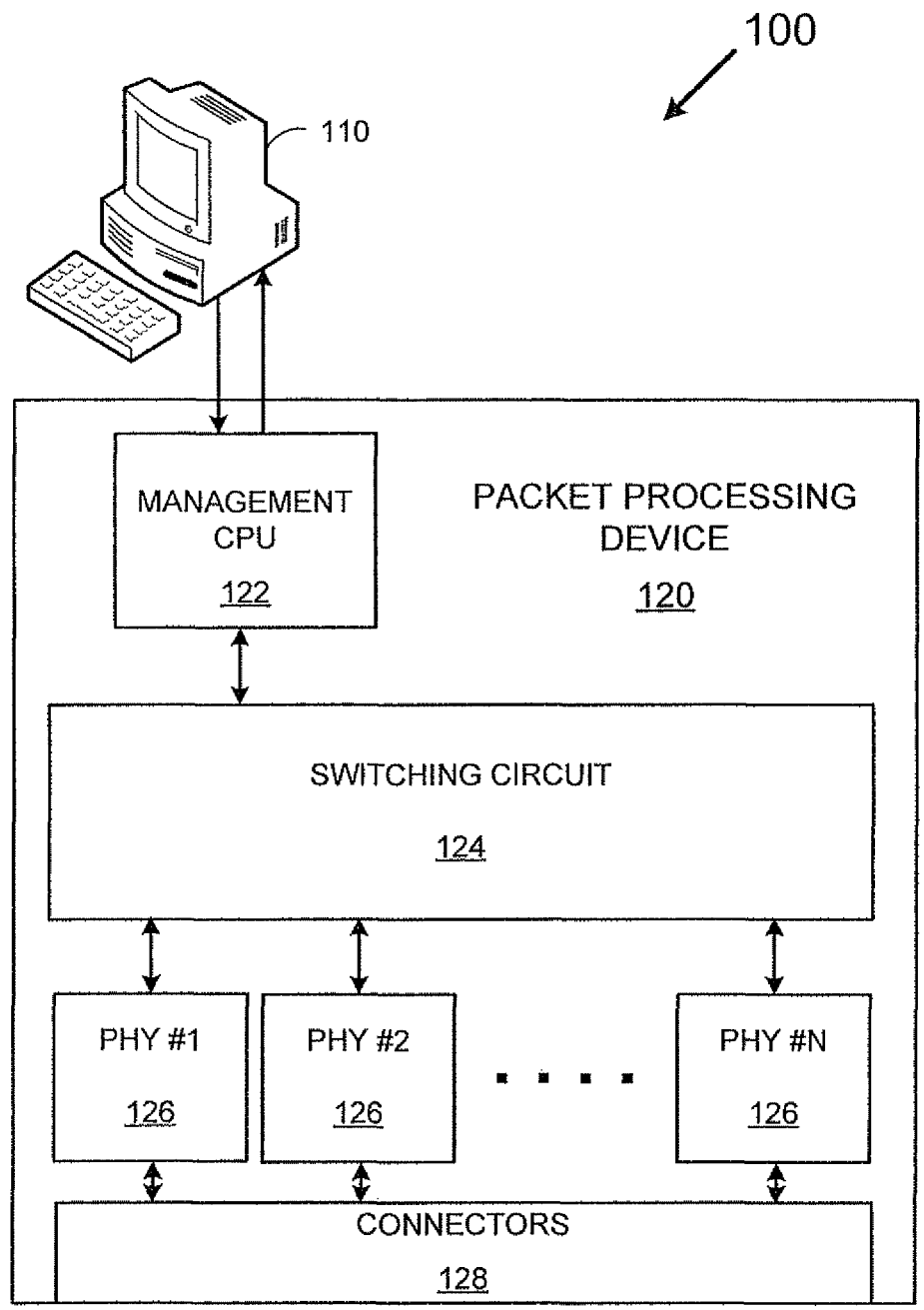
FIG. 1 is a packet-processing packet processor using an example testing method.

FIG. 1 is a test system 100 that includes a computer 110 and a packet-processing device 120, which for the present example is an Ethernet router, in accordance with an embodiment of the present disclosure. The packet-processing device 120 includes a Management CPU 122, a switching circuit 124, a plurality of physical interface devices 126 (commonly known as "PHYs"), and a set of connectors 128.

Although the example computer 110 is depicted as a personal computer having a screen and keyboard, it is noted that the computer 100 may take a variety of other forms such as a server, a mainframe computer, or any other processor-based device containing one or more central processing units and memory.

In operation, the computer 110 initializes the packet-processing device 120 (via Management CPU 122) through a series of commands to enter into any number of test modes. That is, the computer 110 chooses test modes or list of tests to be executed. Next, the Management CPU (or some other device, such as computer 110) generates one or more test packets containing any of various test patterns, and downloads the test packets/patterns into a memory located in the switching circuit 124. The Management CPU 122 then configures packet-processing device 120 to create and/or forward and/or otherwise process the test packets, checks results of packet processing operations and prepares reports with test results as will be explained below.

As the packet-processing device 120 conducts the instructed test(s), the packet-processing device 120 sends test result information to the computer 110 (via Management CPU 122) regarding any number of tests performed to detect packet processing errors, such as for example, and without limitation, packet forwarding errors, packet error counts, bit error counts, general health and operational status information from the various ports, queues, buffers and memories of the packet-processing device 120, whether the processed packets and/or the packet-processing device 120 conform to a particular Ethernet (or other) network standard (e.g., maximum bit rate or packet rate transfer), ability of the packet-processing device 120 to perform packet processing operations under stress, and so on. During or subsequent to any testing, the computer 110 compiles a performance log, then determines the fitness of the packet-processing device 120 based on the test information received, and either "pass" or "fail" the packet-processing device 120, or otherwise provide detailed error information to a technician or other user.

Figure 2:
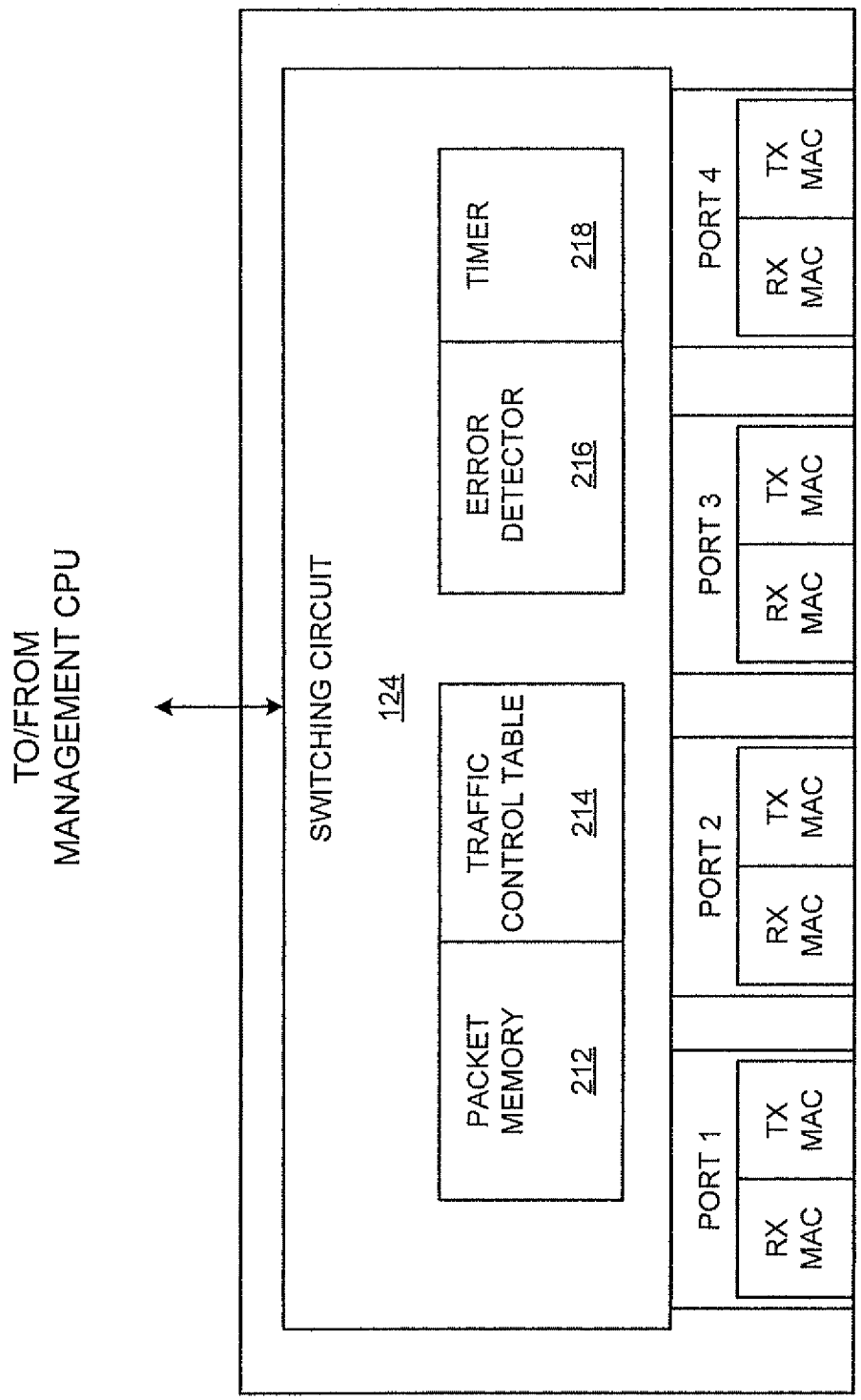
FIG. 2 is an example switching circuit capable of allowing self-testing with minimal external equipment for the packet-processing device of FIG. 1.

FIG. 2 is a block diagram depicting the switching circuit 124 of FIG. 1, which enables self-testing of the packet-processing device 120 using minimal external equipment. The switching circuit 124 includes a packet memory 212, a traffic control table 214, an error detector 216, a timer 218, and a number of ports {PORT 1 . . . PORT 4} with each port {PORT 1 . . . PORT 4} including a receive media access controller (RX MAC) and a transmit media access controller (TX MAC). The example switching circuit 124 is derived from an application specific integrated circuit (ASIC) containing digital logic and memory. In other example embodiments, however, it is noted that the switching circuit 124 is formed from any number of electronic and/or optical technologies as may be found necessary or advantageous. While the example switching circuit 124 includes four ports {PORT 1 . . . PORT 4}, in other embodiments the number of ports vary according to any number of design requirements or preferences.

As will be seen below, any of the plurality of ports {PORT 1 . . . PORT 4} is configurable to allow a respective TX MAC to loop-back packets to a respective RX MAC at the MAC level. In various embodiments, this loop-back function is selectively enabled between a TX MAC and RX MAC of the same port or of different ports.

In accordance with an embodiment, the switching circuit 124 is configured using various internal circuitry in such a way that the switching circuit 124 is enabled to provide test packets to any TX MAC for transmission, and accept received test packets from any RX MAC according to a wide variety of configurations as will be discussed below such that the packet processing device 120 can self-test with little or no external equipment. Still other internal circuitry within the switching circuit 124, in an embodiment, enables any received packet from any RX MAC to be forwarded to any of the TX MACs.

Figure 3A:
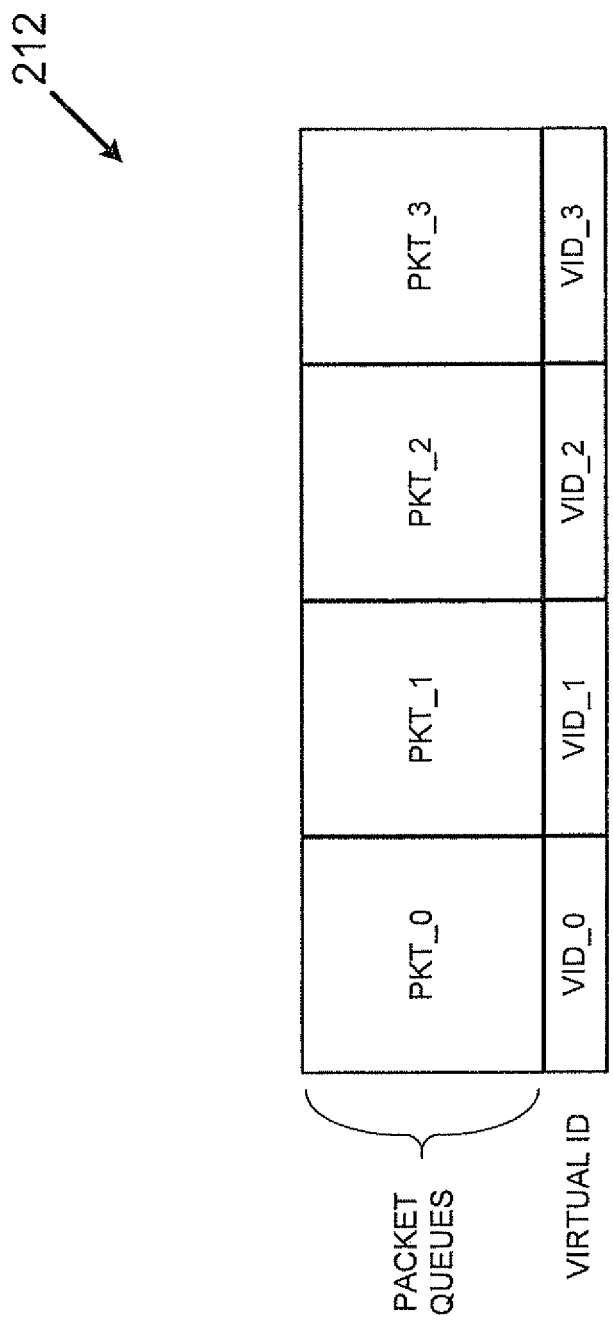
FIG. 3A shows details of a packet memory of FIG. 2.

FIG. 3A shows details of the packet memory 212 of FIG. 2. The example packet memory 212 includes four separate packet queues {PKT_0, PKT_1, PKT_2, PKT_3} —one for each port of the packet-processing device 120. Each packet queue {PKT_0, PKT_1, PKT_2, PKT_3} has a respective virtual ID field containing an optionally programmable virtual identification {VID_0, VID_1, VID_2, VID_3} that is used to associate a given queue with a particular TX MAC. Each packet queue (PKT_0, PKT_1, PKT_2, PKT_3) is capable of containing one or more packets or patterns usable to populate packets. In different embodiments, there are greater or fewer packet queues. In still different embodiments, individual queues are associated with multiple TX MACs.

FIG. 3B shows details of the traffic control table 214 of FIG. 2. The example traffic control table 214 includes four separate columns—one for each port {PORT 1 . . . PORT 4} of the packet-processing device 120. In different embodiments having different numbers of ports, the number of columns varies proportionately. The example traffic control table 214 also includes a number of rows including a row of optionally programmable virtual identification {VID_0, VID_1, VID_2, VID_3} that enables the traffic control table 214 to map a physical port to a logical port. As with the number of columns, different embodiments having different number of ports can affect the number of the number of rows in the traffic control table 214.

The example traffic control table 214 further includes a loopback enable field that enables a particular port to loopback/mirror (i.e., effectively replicate) test packets and provide the mirrored/copied version of the test packet back to the respective TX MAC thus allowing any port to create a packet storming operation. Packet storming is a condition where a packet of information is replicated in a network as the packet is forwarded to its destination causing the destination to receive multiple copies of the same packet. Generally, packet storming in a network is undesirable as it causes communication bandwidth to be needlessly used. However, in the disclosed methods and systems packet storming is advantageously used to replicate looped back packets at a port so as to allow individual ports to easily create large number of packets in one or more simulated streams that can be used to test bandwidth capability of a network or of individual components in a network. For instance, in the example of FIG. 1 packet storming is selectively used to generate an increased volume of test packets, respective of a volume of test packets received from a packet generator (e.g., computer 110, the Management CPU 122 and/or the packet memory 212). Such storming operations are used to place the packet-processing device 120 under a high level of operational stress for testing.

In an example, the storming operation is used to test the ability of packet-processing device to correctly process an increased volume of packets and/or to simultaneously perform multiple simultaneous independent packet processing operations, such as forwarding and mirroring. During this time of continuous simulated traffic, in an embodiment, the switching circuit 124 and the various TX MACs and RX MACs perform error detection, e.g., monitor bit-errors of received packets, and monitor overall performance, where after the error and performance data is provided to an external device, such as the computer 110 of FIG. 1.

As is also seen in FIG. 3B, the traffic control table 214 also includes an array of packet destination enable fields {MAC_X_0, MAC_X_1, MAC_X_2, MAC_X_3} that when enabled couples a particular TX MAC to an RX MAC of another port.

Figure 4A:
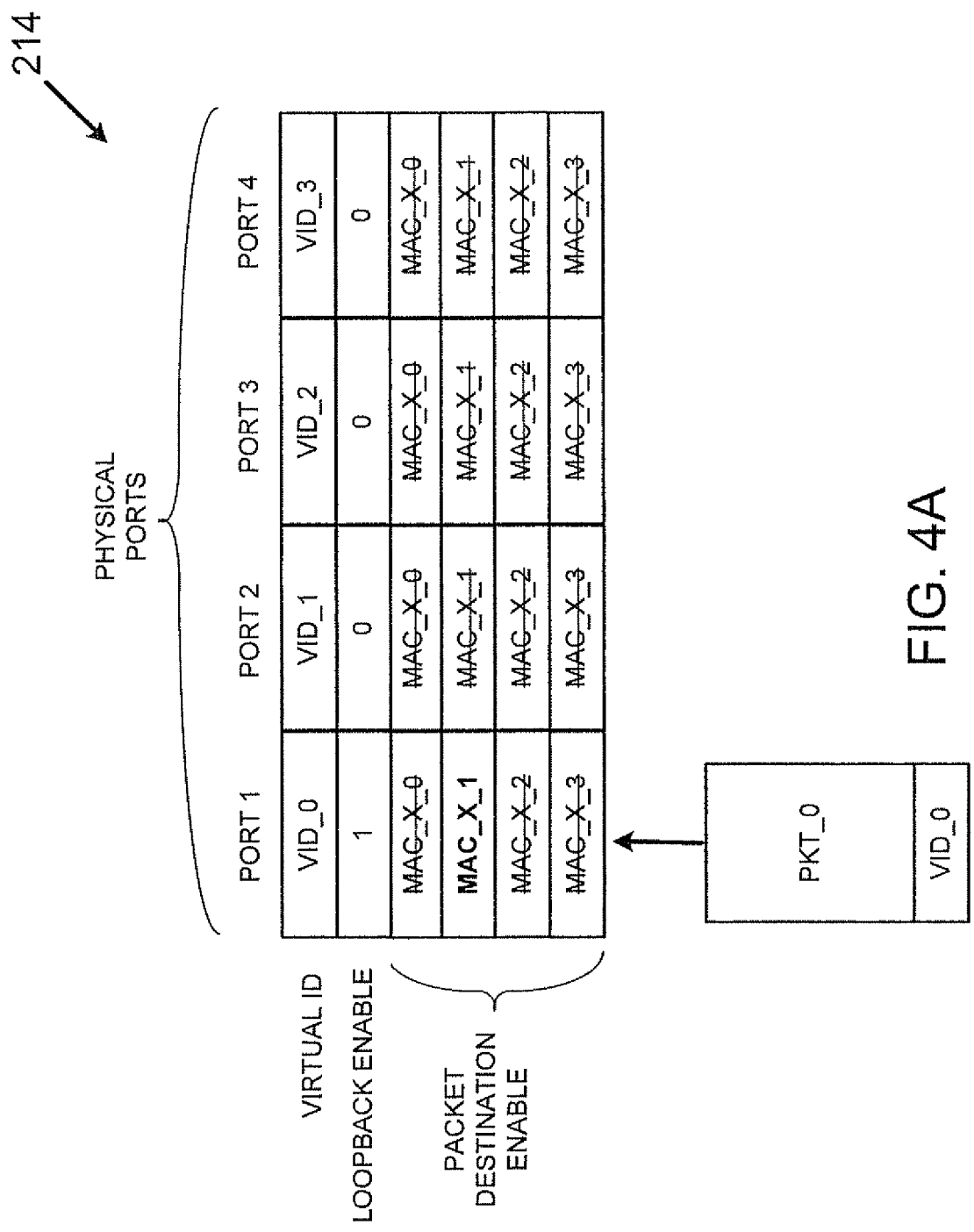
FIG. 4A depicts a first configuration for the traffic control table of FIG. 2 that enables the packet processor to perform a one-to-one port test using data mirroring on the transmit port.

FIG. 4A is a first example configuration for the traffic control table 214 of FIG. 2 that enables the packet-processing device 120 to perform a one-to-one port test using data mirroring on PORT 1. For ease of explanation and demonstration, enabled fields/data paths are bolded while non-enabled fields/data paths are as crossed out. The loopback enable field for PORT 1 only is enabled, and the MAC_X_1 field is enabled so as to couple the TX MAC of PORT 1 to the RX MAC of PORT 2, which for the present example is virtual port MAC_X_1. All other data paths are to be inactive. Packet data is provided by packet queue PKT_0.

Figure 4B:
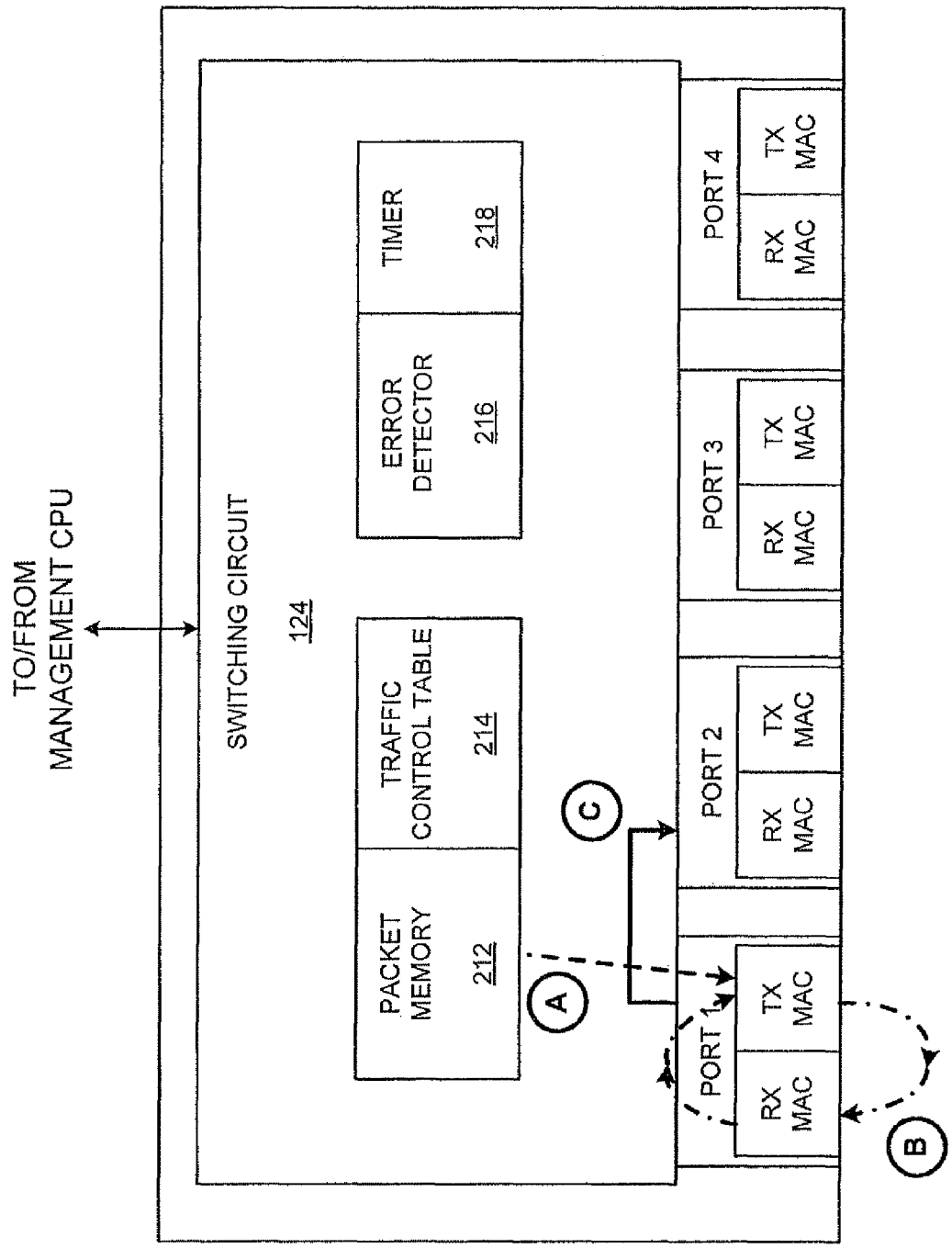
FIG. 4B depicts one-to-one packet data flow in the switching circuit of FIG. 2 according to the traffic control table configuration of FIG. 4A.

FIG. 4B depicts one-to-one packet data flow in the switching circuit 124 of FIG. 2 operating according to the traffic control table configuration shown in FIG. 4A. As is depicted in FIG. 4B, (step A) under direction/control of the traffic control table 214 information/bit patterns for one or more different packets are internally forwarded from the packet memory 212 to PORT 1. Next, (step 13) PORT 1 performs a packet storming operation to create a stream of packets by mirroring packets as they are sent from the TX MAC to the RX MAC at the PITY level, then looped back to the TX MAC from the RX MAC at the MAC level. Then, (step C) the packet copies created in the packet storming operation in PORT 1 are internally fed to the RX MAC of PORT 2.

Assuming that timer 218 is enabled for N seconds, a stream of repeated packets will be transmitted from PORT 1 to the RX MAC of PORT 2 for exactly N seconds during which time the error detector 216 directly or indirectly monitors packet and other errors experienced by one or all of the ports. At the end of the test period, the error detector 216 will provide its test data to computer 100 or the management CPU 122 for further analysis on the performance of the packet-processing device 120.

Figure 5A:
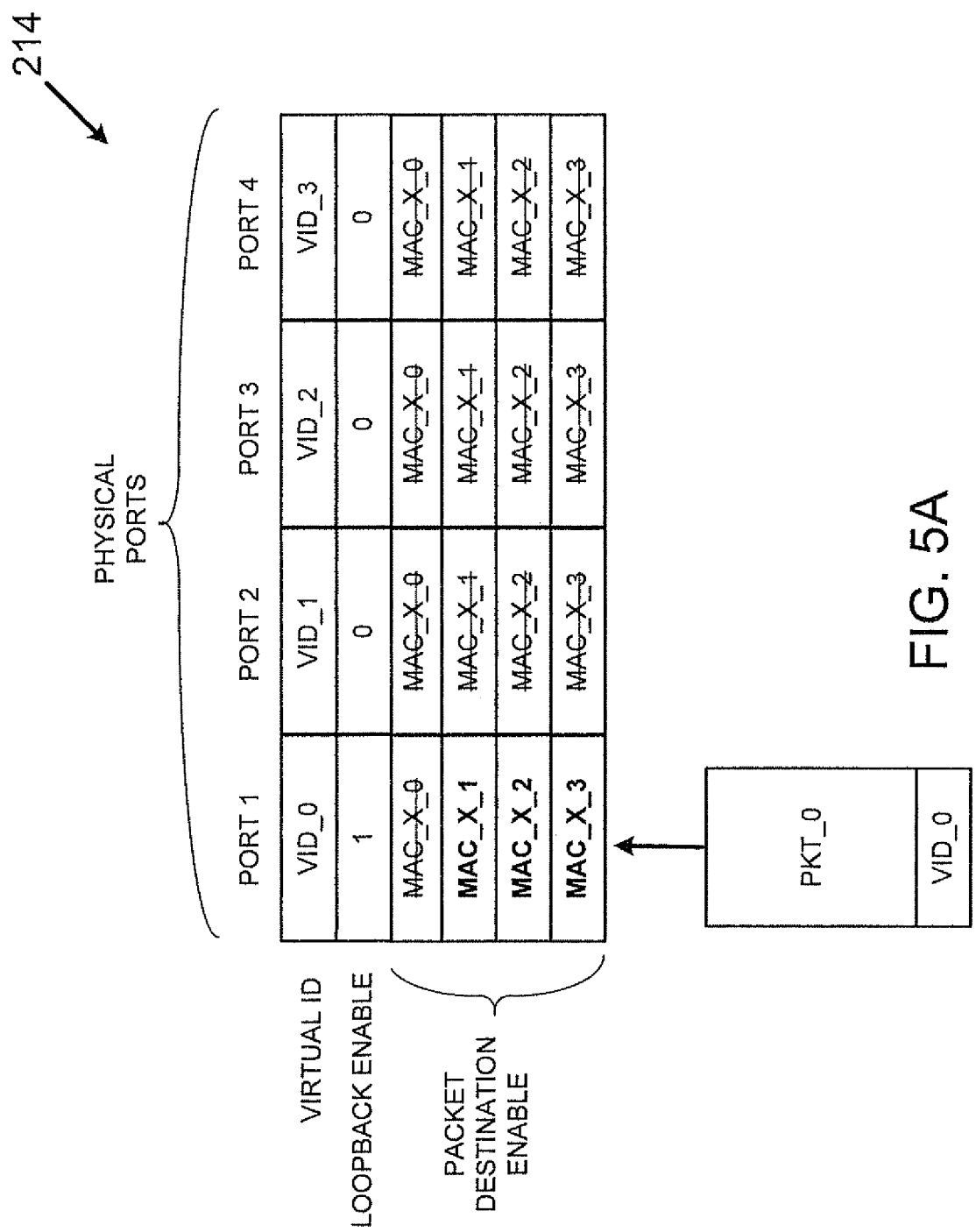
FIG. 5A depicts a second configuration for the traffic control table of FIG. 2 that enables the packet processor to perform a one-to-many port test using data mirroring on the transmit port.

FIG. 5A depicts a second configuration for the traffic control table 214 of FIG. 2 that enables the packet-processing device 120 to perform a one-to-many port test using data mirroring on the TX MAC of PORT 1. The loopback enable field for PORT 1 is enabled as are the MAC_X_1, MAC_X_2, and MAC_X_3 field. All other loopback and data paths are inactive. Packet data is again provided by packet queue PKT_0.

Figure 5B:
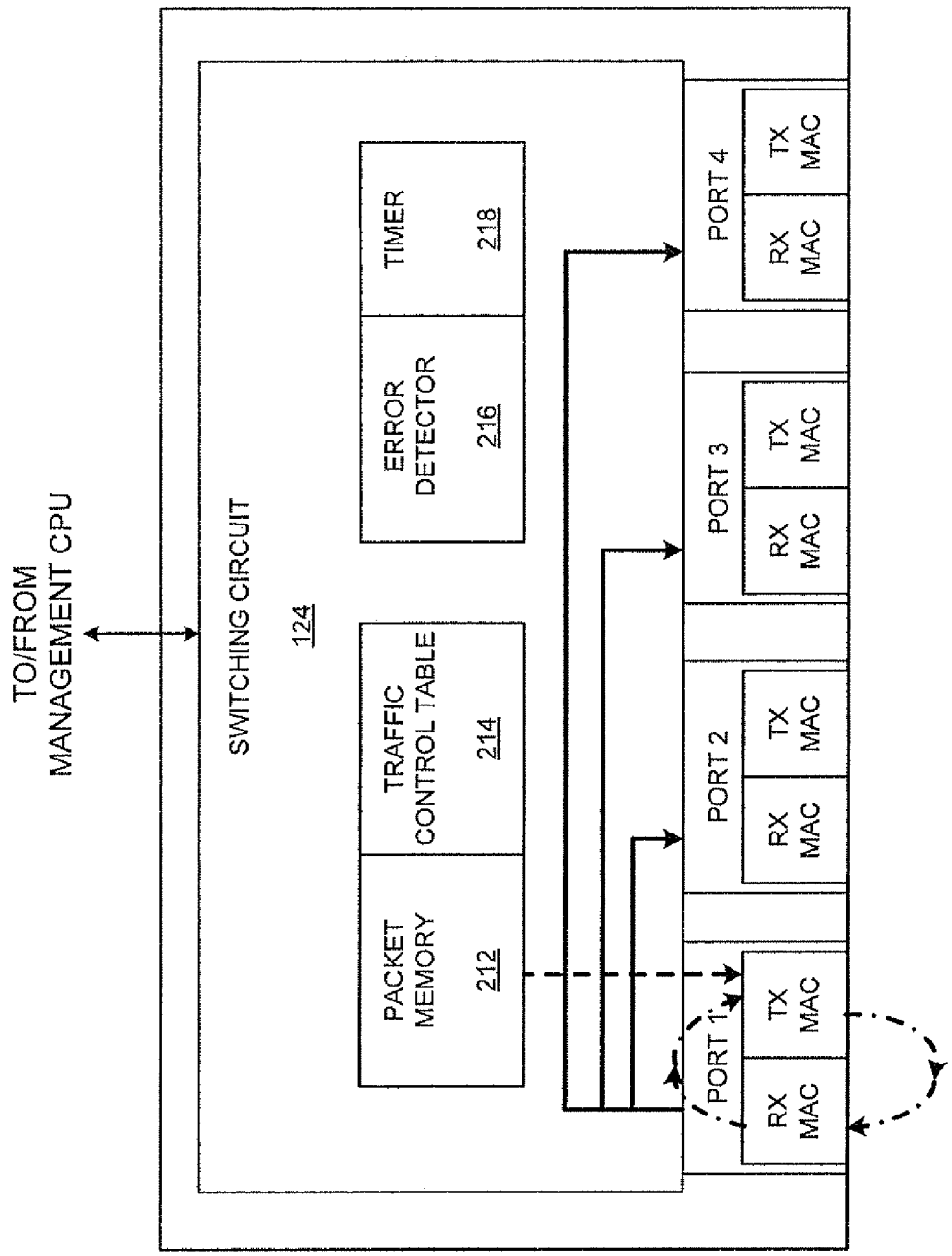
FIG. 5B depicts one-to-many packet data flow in the switching circuit of FIG. 2 according to the traffic control table configuration of FIG. 5A.

FIG. 5B depicts one-to-many packet data flow in the switching circuit 124 of FIG. 2 according to the traffic control table configuration of FIG. 5A. For this configuration, PORT 1 performs a packet storming operation to create a stream of repeating packets, copies of which are fed to the RX MAC of PORT 2, PORT 3 and PORT 4.

Again assuming that timer 218 is enabled for N seconds, the stream of repeated packets will be transmitted from the TX MAC of PORT 1 to the RX MAC of PORT 2, PORT 3 and PORT 4 for exactly N seconds during which time the error detector 216 monitors packet and other errors experienced by one or all of the ports. At the end of the test period, the error detector 216 again will provide its test data to computer 100 or the management CPU 122 for further analysis on the performance of the packet-processing device 120.

Figure 6A:
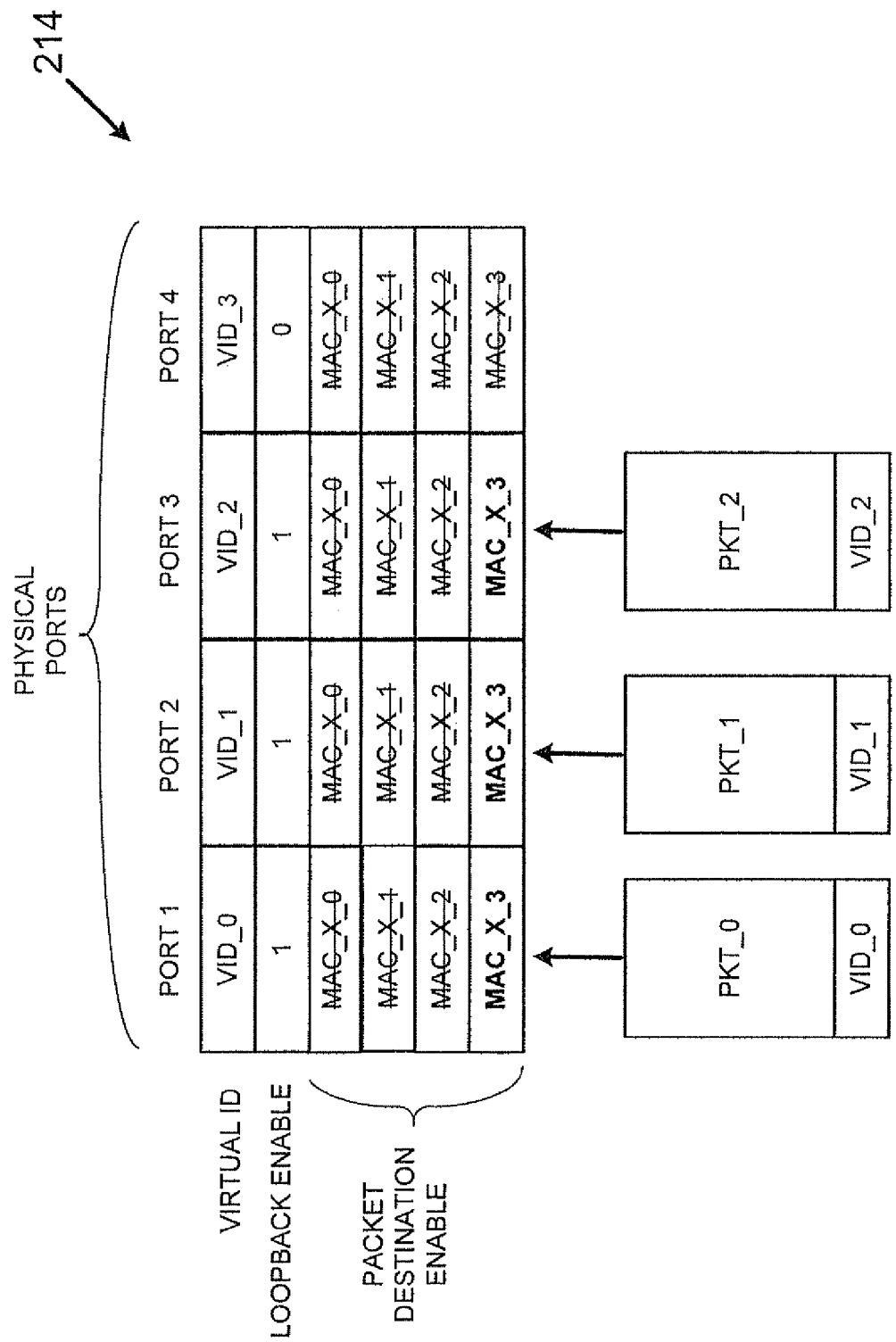
FIG. 6A depicts a third configuration for the traffic control table of FIG. 2 that enables the packet processor to perform a many-to-one port test.
Figure 6B:
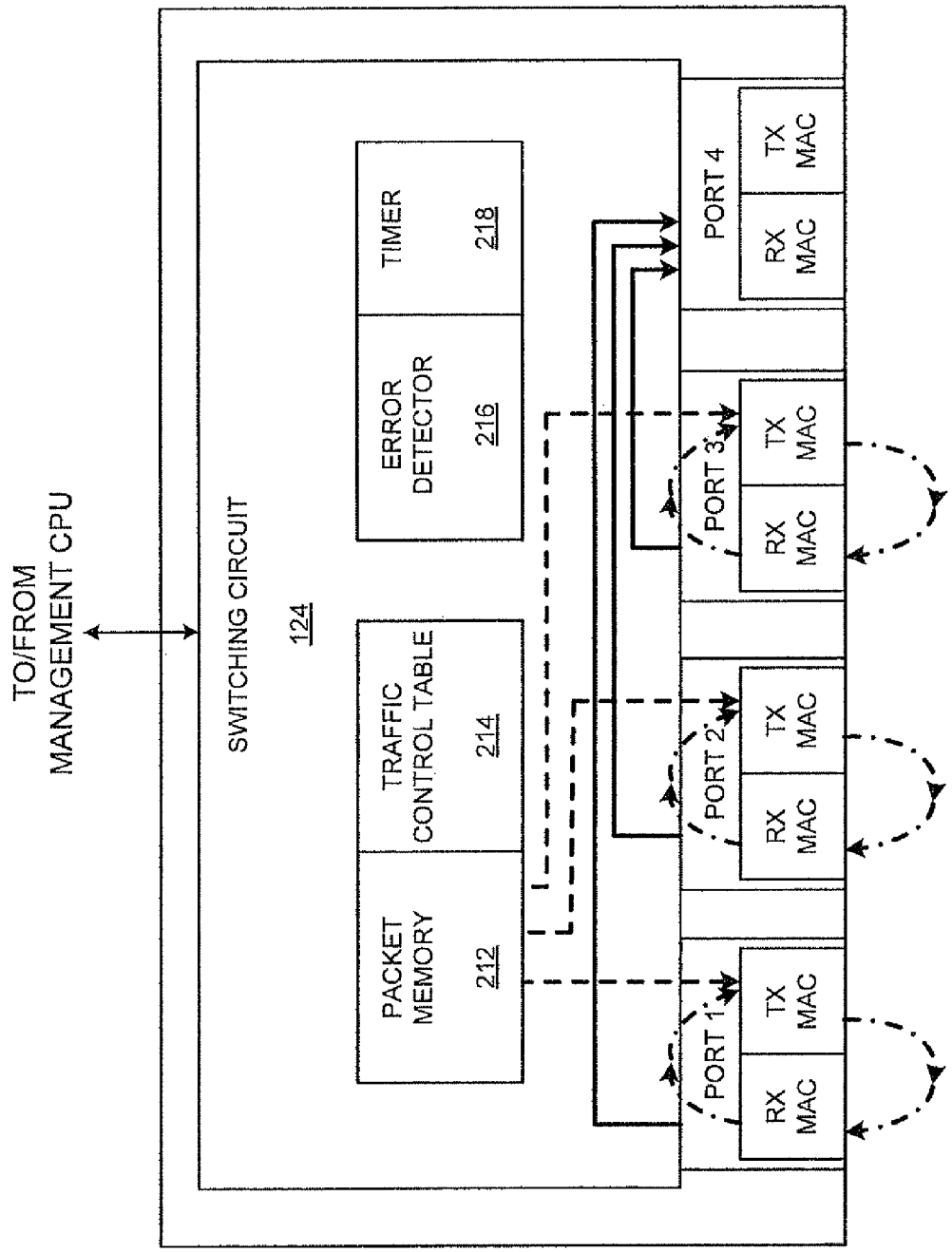
FIG. 6B depicts many-to-one packet data flow in the switching circuit of FIG. 2 according to the traffic control table configuration of FIG. 6A.

FIG. 6A depicts a third configuration for the traffic control table 214 of FIG. 2 that enables the packet-processing device 120 to perform a many-to-one port test. FIG. 6B depicts the resultant many-to-one packet data flow in the switching circuit of FIG. 2 according to the traffic control table configuration of FIG. 6A. Again for this example, packet storming is optionally provided by each of the transmitting ports. Optionally, continuous streams of packets are provided without use of packet storming by, for example, repeatedly feeding data/bit patterns from a circular data queue in the packet memory 212 to PORT 1, PORT 2 and PORT 3.

Figure 7A:
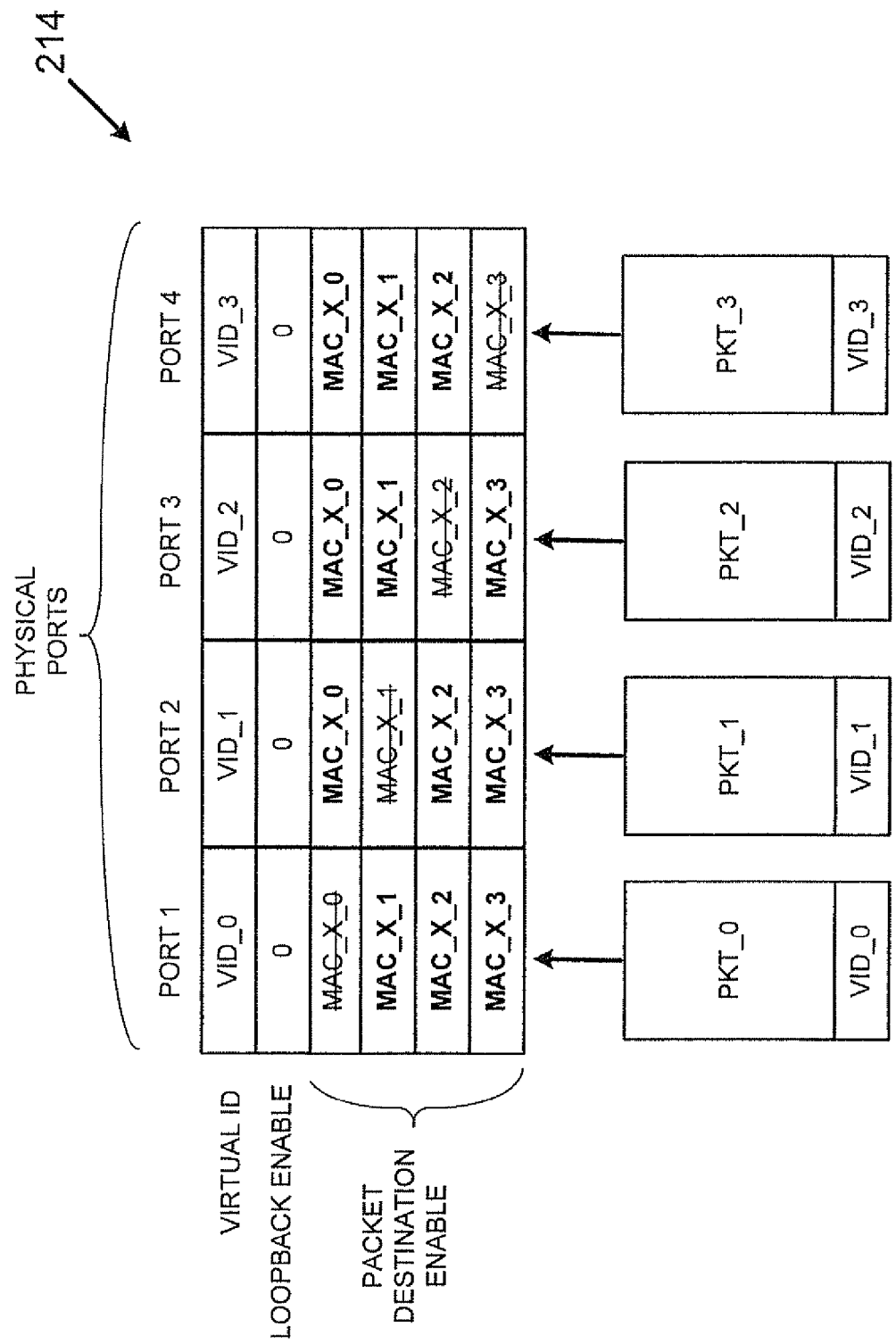
FIG. 7A depicts a fourth configuration for the traffic control table of FIG. 2 that enables the packet processor to perform a full-mesh port test.
Figure 7B:
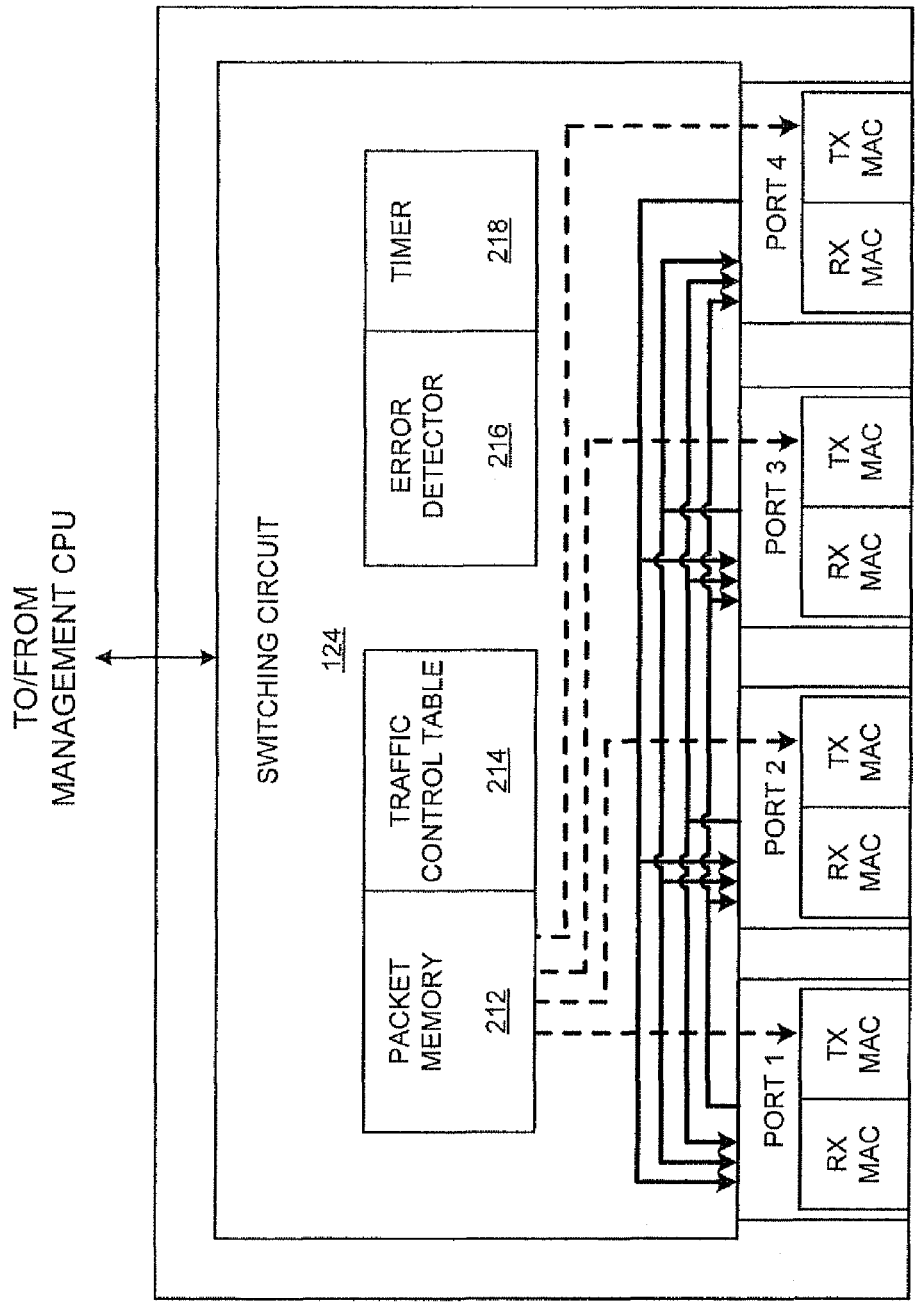
FIG. 7B depicts a full mesh packet data flow in the switching circuit of FIG. 2 according to the traffic control table configuration of FIG. 7A.

FIG. 7A depicts a fourth configuration for the traffic control table 214 of FIG. 2 that enables the device under test to perform a many-to-many (e.g., full-mesh) port test. FIG. 7B depicts a full mesh packet data flow in the switching circuit 124 of FIG. 2 according to the traffic control table configuration of FIG. 7A. As with the previous examples, packet storming (not depicted in FIG. 7B) is optionally used to provide continuous streams of packets from each TX of a port to the RX of the other ports.

Figure 8:
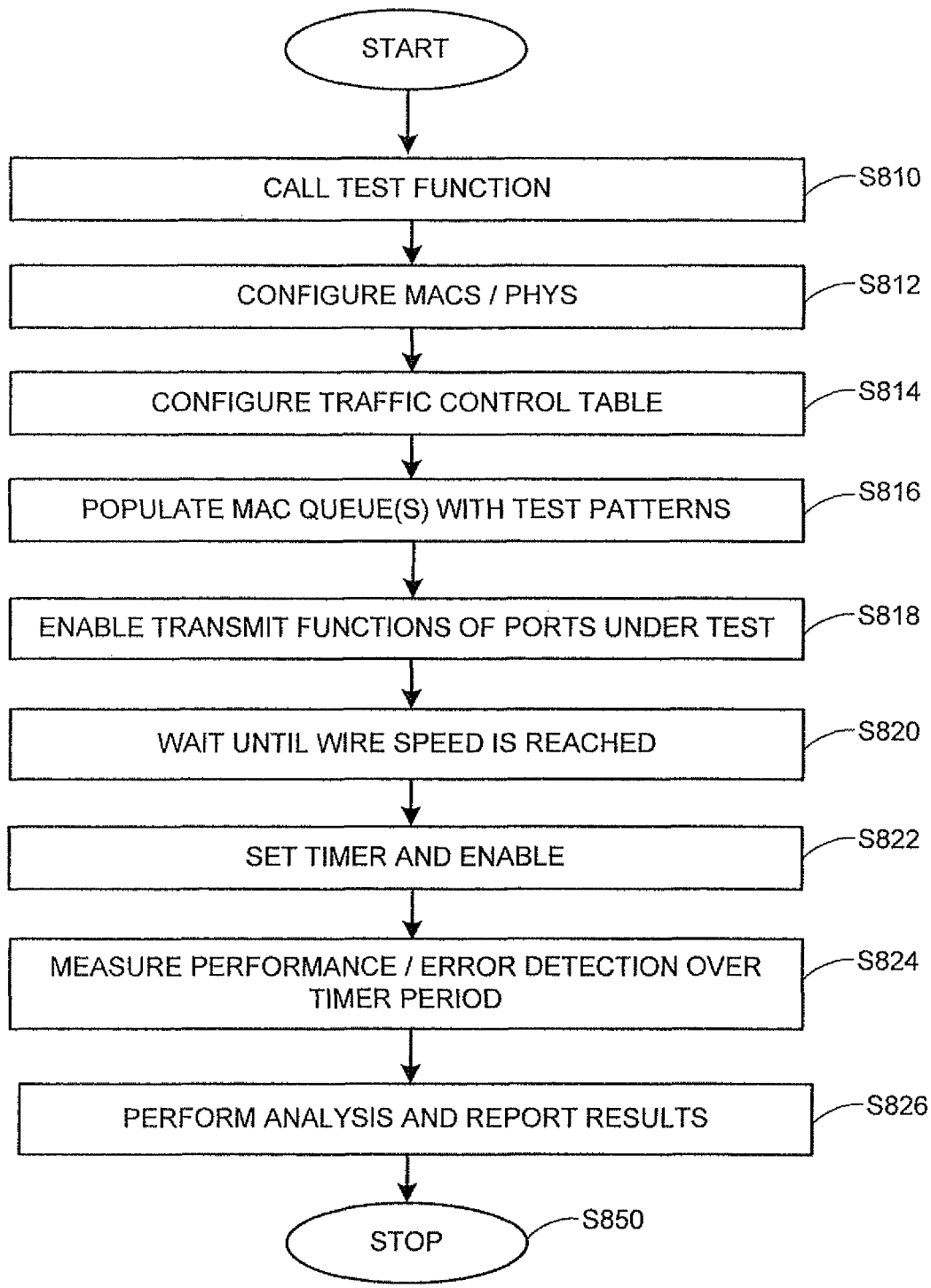
FIG. 8 is a flowchart outlining an operation of the disclosed methods and systems for testing the packet-processing device of FIG. 1.

FIG. 8 is a flowchart outlining an operation of the disclosed methods and systems for testing the packet-processing device of FIG. 1. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts in step S810 where a test function residing in a personal computer (or other processing device) and connected to a packet-processing device is evoked by a user.

Next, the packet-processing device is configured according to the following steps.

In step S812, the TX MACs and RX MACs for various ports, as well as their respective PHYs, are configured according to any one of a number of different communications protocols; the various MACs being configured to transmit/receive according to desired data transmission rates. Next, in step S814, a traffic control table capable of controlling the operation of the various MACs is configured to allow for any number of different connectivity scenarios, e.g., one-to-one, one-to-many, many-to-one, and many-to-many. As discussed above, such a traffic control table includes data identifying various physical ports with virtual ports, include a loopback enable function for each port that allows for mirroring copies of test packets from an RX MAC to its respective TX MAC. The traffic control table also includes a packet destination enable array that steer data from any one TX MAC to the RX MAC of one or more different ports. Such configuration of the traffic control table allows selectively enabling the RX MACs of any port to receive transmitted copies of the one or more first test packets transmitted from the TX MAC of any other port so as to enable the different connectivity scenarios. Then, in step S816, a number of data queues capable of providing data to the various TX MACs is populated using any number of different data patterns/packets from a pattern/packet generator usable for testing a packet-processing device. Control continues to step S818.

In step S818, the various devices, e.g., TX MACs for those ports to be tested, are enabled, and in step S820 the various TX MACs are allowed time to come up to full operational speed. Then, in step S822, a timer is set to operate for a limited time period, and then allowed to time out. Control continues to step S824.

In step S824, the performance of the various MACs is monitored for errors over the time period determined by the timer of step S822. Thereafter, in step S826, an analysis of the performance of the packet-processing device is performed using the data collected in step S824, and the results are reported to the user. Control then continues to step S850 where the process stops.

The above-described devices, systems and methods provide a number of advantages. The first advantage is to provide any level of testing without requiring external test equipment, which can be expensive to develop, purchase and/or maintain. For example, simple internal connectivity from one port to another port can be tested without requiring an external traffic simulator and packet test device.

Just as notable, however, is that very robust and complex testing can be provided without external test equipment. For example, by simultaneously: (1) enabling packet storming at selected ports; (2) forwarding packets from various ports to various other ports; (3) periodically adding and/or substituting new packets/packet patterns with different characteristics; and (4) periodically changing packet traffic patterns by manipulating the traffic control table, a switch or other packet processing device under test can be placed under worst-case stresses. Such stresses include the stress of having to simultaneously perform varying packet processing operations that closely simulate high traffic congestion in real-world communications environments.

The techniques and devices described herein may be implemented by various means. For example, the disclosed techniques may be implemented in hardware, software, or a combination thereof. For a hardware implementation, the various devices performing various processes within one or more application specific integrated circuits (ASICs), digital signal processors (DSPs), programmable logic, field programmable gate arrays (FPGAs), processors, controllers, micro-controllers, microprocessors, other electronic units designed to perform the functions described herein, or a combination thereof.

In various software implementations, the techniques described herein may be implemented with modules (e.g., procedures, functions, and so on) that perform the functions described herein. One or more forms of software code may be stored in one or more memory units and executed by one or more processors. Memory units may be implemented within a processor or external to the processor, in which case it can be communicatively coupled to the processor via various means.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A packet-processing device, comprising:
   a plurality of ports each having a receive media access controller (RX MAC) and a transmit media access controller (TX MAC); and
   a switching engine that includes a traffic control table coupled to the plurality of ports, the switching engine being configured to:
   select a first port, using a traffic control table, from among the plurality of ports;
   provide one or more first test packets to the selected first port, and
   enable the first port to perform a packet storming operation so as to create a stream of repeated first packets that are internally generated in the switching engine; and
   transmit the stream of repeated first packets internally, using the traffic control table, from the first port to one or more second ports selected from among the plurality of ports.

2. The packet processing apparatus of claim 1, wherein the traffic control table includes an array of destination enable fields that when activated cause RX MACs to receive transmitted data from different ports.

3. The packet processing apparatus of claim 1, wherein the traffic control table further comprises a virtual identification field that associates physical ports with logical ports.

4. The packet processing apparatus of claim 1, wherein the traffic control table is further configured to:
   selectively enable the RX MACs of a plurality of second ports to receive transmitted copies of the one or more first test packets so as to perform a one-to-many data traffic test.

5. The packet processing apparatus of claim 1, wherein the traffic control table is further configured to:
   provide one or more first test packets to a plurality of first ports, and
   enable each of the first ports to perform a packet storming operation so as to create a stream of repeated first packets that are internally transmitted from the respective first ports to each of a plurality of selected second ports so as to perform a many-to-many data traffic test.

6. The processing apparatus of claim 1, wherein the switching engine circuit further includes an error detector configured to detect packet processing errors caused by the plurality of ports during a self-test operation.

7. The processing apparatus of claim 6, wherein the switching engine circuit further includes a timer that enables testing for a limited time period.

8. The processing apparatus of claim 1, wherein the apparatus further comprises a management central processing unit (CPU) that configures the switching engine circuit based on commands from an external computer.

9. A method for testing a packet-processor that includes a plurality of ports each having a receive media access controller (RX MAC) and a transmit media access controller (TX MAC), the method comprising:
   selecting a first port, using a traffic control table, from among the plurality of ports,
   providing one or more first test packets to the selected first port,
   enabling the first port to perform a packet storming operation so as to create a stream of repeated first packets, and
   internally transmitting the stream of repeated first packets from the first port to one or more second ports selected from among the plurality of ports.

10. The method of claim 9, wherein transmitting the repeated first packets includes: transmitting the repeated first packets from the first port to a plurality of second ports so as to perform a one-to-many data traffic test.

11. The method of claim 9, further comprising:
   providing one or more test packets to a plurality of first ports, enabling each of the first port to perform a packet storming operation so as to create a stream of repeated first packets, and transmitting the repeated first packets from the respective first ports a second port so as to perform a many-to-one data traffic test.

12. The method of claim 11, further comprising:

transmitting the repeated first packets from the respective first ports to each of a plurality of second ports so as to perform a many-to-many data traffic test.

13. The method of claim 9, further comprising:

storing test packets in a packet memory that a traffic control table can selectively steer to respective ports.

14. The method of claim 9, further comprising:

performing error detection so as to detect packet processing errors caused by the plurality of ports during a self-test operation.

15. A chipset for implementing a packet-processing apparatus configured to perform self-testing that includes one or more integrated circuits together comprising:

a plurality of ports each having a receive media access controller (RX MAC) and a transmit media access controller (TX MAC); and a switching engine that includes a traffic control table coupled to the plurality of ports, the switching engine being configured to:

select a first port, using a traffic control table, from among the plurality of ports;

provide one or more first test packets to the selected first port, and enable the first port to perform a packet storming operation so as to create a stream of repeated first packets that are internally generated in the switching engine; and transmit the stream of repeated first packets internally, using the traffic control table, from the first port to one or more second ports selected from among the plurality of ports.

16. The chipset of claim 15, wherein the traffic control table is further configured to:

provide one or more first test packets to a plurality of first ports, and enable each of the first ports to perform a packet storming operation so as to create a stream of repeated first packets that are internally transmitted from respective first ports to each of a plurality of selected second ports so as to perform a many-to-many data traffic test.

17. The chipset of claim 15, wherein the switching engine circuit further includes an error detector configured to detect packet processing errors caused by the plurality of ports during a self-test operation.

18. The chipset of claim 17, wherein the switching engine circuit further includes a timer that enables testing for a limited time period.

* * * * *